(12) United States Patent
Koch et al.

(10) Patent No.: US 11,982,264 B2
(45) Date of Patent: May 14, 2024

(54) PUMP SYSTEM WITH CLUTCHES

(71) Applicant: HANON SYSTEMS EFP DEUTSCHLAND GMBH, Bad Homburg v. d. Höhe (DE)

(72) Inventors: Andreas Koch, Frankfurt (DE); Mohamed Lamzoughi, Frankfurt am Main (DE); Björn Ritter, Biebergemünd (DE)

(73) Assignee: HANON SYSTEMS EFP DEUTSCHLAND GMBH, Bad Homburg V. D. Höhe (DE)

( * ) Notice: Subject to any disclaimer, the term of this patent is extended or adjusted under 35 U.S.C. 154(b) by 0 days.

(21) Appl. No.: 17/756,727

(22) PCT Filed: Apr. 5, 2021

(86) PCT No.: PCT/IB2021/052803
§ 371 (c)(1),
(2) Date: Jun. 1, 2022

(87) PCT Pub. No.: WO2021/209854
PCT Pub. Date: Oct. 21, 2021

(65) Prior Publication Data
US 2023/0029138 A1 Jan. 26, 2023

(51) Int. Cl.
*F04B 23/04* (2006.01)
*F04B 17/03* (2006.01)
*F04B 17/05* (2006.01)
*F16D 43/30* (2006.01)
*F16N 7/38* (2006.01)

(52) U.S. Cl.
CPC .............. *F04B 23/04* (2013.01); *F04B 17/03* (2013.01); *F04B 17/05* (2013.01); *F16D 43/30* (2013.01); *F16N 7/38* (2013.01)

(58) Field of Classification Search
CPC .... F04B 17/03; F04B 17/05; F04B 23/04–14; F04B 9/02; F04B 35/01; F04B 41/06; F16H 57/0435; F16H 57/0439; F16H 57/0441; F16H 61/0031; F16H 2061/0037
USPC .... 417/223, 316, 319, 374, 216, 364, 410.1, 417/426
See application file for complete search history.

(56) References Cited

U.S. PATENT DOCUMENTS 6,454,543 B1 * 9/2002 Beck ....................... F04B 23/04
417/423.1
8,403,646 B2 * 3/2013 Yoshinami .......... F16H 61/0031
417/2
(Continued)

FOREIGN PATENT DOCUMENTS

CN 1872577 A 12/2006
CN 104401225 A 3/2015
(Continued)

*Primary Examiner* — Alexander B Comley
(74) *Attorney, Agent, or Firm* — Shumaker, Loop & Kendrick, LLP; James D. Miller (57) ABSTRACT

A pump system for a motor vehicle having a first pump and a second pump which can be driven by an electric motor and/or an internal combustion engine, wherein the first pump and the second pump can be coupled by a clutch. A method of operating a pump system in a motor vehicle includes driving a first pump and a second pump by an electric motor and/or an internal combustion engine by coupling the first pump and a second pump.

14 Claims, 4 Drawing Sheets

(56) References Cited

U.S. PATENT DOCUMENTS

| | | | | |
|---|---|---|---|---|
| 8,905,724 | B2* | 12/2014 | Hwang | F16D 47/04 |
| | | | | 192/48.8 |
| 9,631,614 | B2* | 4/2017 | Kim | F04B 53/18 |
| 2002/0091034 | A1* | 7/2002 | Nakamori | B60K 6/485 |
| | | | | 477/3 |
| 2009/0232673 | A1* | 9/2009 | Reisch | F16H 61/0031 |
| | | | | 417/364 |
| 2012/0060488 | A1* | 3/2012 | Grethel | F16H 61/0025 |
| | | | | 60/484 |
| 2012/0269653 | A1* | 10/2012 | Lutoslawski | B60K 25/02 |
| | | | | 417/44.1 |
| 2014/0060681 | A1* | 3/2014 | Hwang | F16H 61/0031 |
| | | | | 137/565.3 |
| 2014/0140864 | A1* | 5/2014 | Harten | F04B 9/02 |
| | | | | 417/539 |
| 2017/0167598 | A1* | 6/2017 | Hwang | F16H 61/0267 |
| 2019/0376496 | A1* | 12/2019 | Nassif | F04B 23/04 |

FOREIGN PATENT DOCUMENTS

| | | | | |
|---|---|---|---|---|
| DE | 10016782 | A1 * | 10/2001 | B62D 5/30 |
| DE | 10016782 | A1 | 10/2001 | |
| DE | 102005013137 | A1 | 9/2006 | |
| DE | 10162973 | A1 | 8/2022 | |
| EP | 1992846 | A1 | 11/2008 | |
| JP | H10238480 | A * | 9/1998 | |
| JP | H10238480 | A | 9/1998 | |
| JP | 2008536060 | A | 9/2008 | |
| JP | 2008286108 | A | 11/2008 | |
| KR | 102084326 | B1 | 3/2020 | |

* cited by examiner

PUMP SYSTEM WITH CLUTCHES

CROSS REFERENCE TO RELATED APPLICATIONS

This is a U.S. national phase patent application of PCT/IB2021/052803 filed Apr. 5, 2021 which claims the benefit of and priority to German Pat. Appl. No. 10 2020 204 675.1 filed on Apr. 14, 2020, the entire contents of each of which are incorporated herein by reference.

TECHNICAL FIELD

The invention relates to a pump system for a motor vehicle having a first pump and a second pump which can be driven by an electric motor and/or an internal combustion engine. The invention further relates to a method of operating a pump system in a motor vehicle, and to a motor vehicle with an internal combustion engine or an electric motor and a pump system.

The reduction of fuel and energy consumption in motor vehicles is a key focus of development in the automotive industry. In addition to the development of new technologies, the optimization of existing components is becoming increasingly important. Significant savings potentials can be realized here, without the huge costs that new systems can cause. "Demand-oriented auxiliary units" is the keyword in this context.

The oil pump is one example and an important part of the engine and the transmission. The oil pump has to perform three tasks: lubrication, cooling, control of various hydraulic actuators. These actuators are operated from the engine control. The pressure required for this must be provided by the oil pump.

In order to minimize fuel consumption and pollutant emissions, modern drive concepts are often provided with a circuit that automatically switches off the vehicle drive motor when certain conditions are met. This can be the case, for example, during what is called a gliding operation when the vehicle is coasting as well as when the vehicle is at a standstill, and is known as a start-stop functionality. If it is determined that the driver wants to continue driving or that he requests again a drive torque from the vehicle drive motor by actuating an accelerator pedal, the vehicle drive motor is restarted without any further operating steps by the driver, a corresponding gear is engaged or maintained in the automatic transmission, and a drive clutch is closed.

Since an oil pump mechanically driven by the vehicle drive motor also does not provide any power when the motor is at a standstill, it is known to provide an electrically driven auxiliary oil pump which, when the vehicle drive motor is at a standstill, either continuously maintains the hydraulic supply or provides, at least if required, a corresponding oil flow at the required pressure to enable hydraulic shifting of the automatic transmission and, where applicable, the supply of further units or components.

BACKGROUND ART

Known from DE 102005013137 A1 is a method of controlling an oil supply for an automatic transmission and a starting element in a vehicle, in which at least two oil pumps are provided for supplying at least one hydraulic control device of the automatic transmission and/or the starting element in a high-pressure branch and a low-pressure branch, respectively.

Known from DE 10162973 A1 is a device for controlling the drive of an oil supply, which in addition to a mechanical oil pump comprises an electric oil pump. Both oil pumps are used to supply a hydraulic control unit to actuate an automatic transmission and a clutch located between the drive motor and the transmission. To have sufficient hydraulic pressure and a corresponding oil mass flow available for shifting the automatic transmission and the clutch even when the drive motor is switched off, the electric oil pump is activated on the basis of specific criteria when the rotation speed of the drive engine or the associated hydraulic pressure of the mechanical oil pump falls below a threshold value. After the drive motor was put back into operation and its rotation speed is above a second rotation speed threshold, the electric oil pump is switched off again.

Known from US 2012/0269653 A1 is a fluid pump system for a motor vehicle with an internal combustion engine, wherein a planetary gear is coupled to an internal combustion engine, an electric motor and a pump. Due to interaction of the electric motor and the internal combustion engine by a common transmission, the pump is operated efficiently in the given power range.

For reasons of costs, pumps in the prior art are often constant displacement pumps, i.e. the output is not adjustable. In order to allow a demand-oriented supply by a pump, this pump can be configured as a variable displacement pump or a switching pump. However, these pumps have a more complex configuration, incur higher costs and often exhibit lower efficiency.

SUMMARY

The invention is based on the object of providing a pump system for a motor vehicle and a method of operating a pump system in a motor vehicle, which meets the requirements for a required volume flow rate and pressure in an energetically favorable manner and with low equipment costs.

According to the invention, this object is solved by a device having the features of patent and method as shown and described herein.

The invention is based in particular on the finding that a required volume flow rate and pressure must be variable and controllable according to the situation in order to reduce the energy consumption of the pumps and, thus, the fuel consumption or the total energy consumption of a motor vehicle. It was realized at the same time that in order to keep the construction effort low, it is reasonable to integrate the already known units of a pump system from the prior art into a new optimized pump system. To embrace these two basic ideas, the existing pumps, which often differ in their performance, must be able to be driven both variably by the respective drive units and also independently of one another. This is made possible by connecting the individual components of the pump system, in particular the pumps and the drive units, by means of clutches that are coupled and decoupled in a particular case of need.

Using this knowledge, the invention provides a pump system for a motor vehicle, wherein the pump system comprises: a first pump and a second pump which can be driven by an electric motor and/or an internal combustion engine, characterized in that the first pump and the second pump can be coupled by means of a clutch.

The invention thus ensures that a first pump and a second pump can be driven both decoupled, thus independently of each other, and also coupled by an internal combustion engine and/or an electric motor. In this way, the required volume flow rate and pressure are adjusted variably, individually and situationally depending on the demand in the motor vehicle by switching on and off the two pumps. This has the advantage that only the actually required volume flow rate and pressure are provided. Consequently, a pump is only driven when a volume flow rate and pressure are needed, and the energy consumption is reduced compared to a permanently driven pump.

A further advantage is that a pump can be operated in a power range that is optimal in terms of its energy consumption. In other words, a pump can be switched on when the required volume flow rate and pressure correspond to the volume flow rate and pressure at which the pump operates efficiently in terms of its energy consumption. At the same time, it is possible to switch off a pump when operation falls into a performance range that can be covered more efficiently by a different pump. Thus, the energy fuel consumption of a motor vehicle is ultimately reduced.

Furthermore, it is advantageous that the present pump system makes use of pumps which are already used as standard in a motor vehicle. This makes it possible to keep the construction effort and, consequently, the manufacturing costs of the pump system low.

Preferably, the pump system is configured in such a manner that the internal combustion engine and the first pump can be coupled by means of a first clutch, and the first pump and a second pump can be coupled by means of a second clutch, and the electric motor and the second pump can be coupled by means of a third clutch. It thus becomes possible that the first pump can be driven independently of the internal combustion engine by coupling to the second pump which is coupled to the electric motor. Conversely, the second pump can also be driven independently of the electric motor by coupling to the first pump which is coupled to the internal combustion engine. In addition, the first pump, the internal combustion engine, and the second pump, coupled to the electric motor, can be driven independently. This has the advantage that the pump capacity of both pumps can be used when the internal combustion engine in the motor vehicle is switched off. However, if there is not sufficient electric energy available in the motor vehicle, the internal combustion engine can take over the driving of both pumps. Consequently, the pump system or both pumps are to be operated independently of the power supply state of the motor vehicle.

Furthermore, it is advantageous when there is a high demand for volume flow rate and pressure, that only the drive power of the internal combustion engine can be used to drive both pumps since the operation in the upper power range of the pumps can be carried out more efficiently by the internal combustion engine.

At the same time, it is advantageous when there is a low demand for volume flow rate and pressure, to only drive the second pump by the electric motor, by decoupling the first pump from the internal combustion engine and from the first pump, since the drive in the lower power range of the pumps is more efficient with the electric motor.

In an even further preferred embodiment of the invention, the pump system is configured in such a manner that a pressure line of the first pump and a pressure line of the second pump are connected by means of a connecting line. In this way, it is achieved that the pressure lines of the first and the second pumps communicate with each other, and the volume flow rates can alternately be diverted. This leads to the advantage that the volume flow rate and pressure in one pressure line can be increased by feeding the volume flow rate of the other line, or a target unit can be supplied with a volume flow rate and pressure from both pumps.

In an even further preferred embodiment of the invention, the pump system is configured in such a manner that at least one controllable and/or non-controllable valve is installed in the pressure lines and/or connecting lines, in particular a flow valve, check valves, a pressure valve, or a directional control valve. This allows the volume flow rate and pressure to be controlled. In this regard, for example, it is advantageous that fluctuations in volume flow rate and pressure can be absorbed.

Moreover, the volume flow rates and pressures in the pressure lines downstream of the first and second pumps can be in adjustable communication, or a volume flow rate in the pressure line of the first pump can be diverted as needed to the pressure line of the second pump, or vice versa. The advantage of this is that a volume flow rate can be diverted according to need and in a controlled manner.

As regards the pump system, it is further preferred that the pressure line of the first pump and the pressure line of the second pump are connected to at least one target unit, in particular to two differing target units. Hereby it is achieved that several targets are supplied at the same time with a respective volume flow rate and pressure. The resulting advantage is that the pump system supplies a plurality of consumers.

In a further preferred embodiment, the pump system is configured in such a manner that a first target unit is a hydraulic control unit, and a second target unit is a unit for a transmission to be cooled and lubricated, in particular an automatic transmission. In this way, it is possible for a transmission to be lubricated and cooled at the same time while a hydraulic is actuated in a hydraulic control unit by the pumped [sic]. The advantage is that the same fluid, in particular an oil-based fluid, can be used that can be pumped through both pumps.

It is further preferred that the first and second clutches in the pump system are shifting clutches, and the third clutch is a one-way clutch, wherein the shifting clutches are actuated in particular mechanically, electromechanically, hydraulically or pneumatically. This allows the first pump to be variably and completely decoupled from the internal combustion engine and the second pump, wherein the coupling process can be carried out mechanically, electromechanically, hydraulically or pneumatically. It is advantageous that the coupling can be controlled and regulated by means of the shifting clutches.

It is also an advantage that the individual units can be operated independently of each other at a specific rotation speed.

In a further preferred embodiment, the pump system comprises a one-way clutch that has a freewheel against the direction of rotation of a shaft of the internal combustion engine. Thus, it is ensured that no torque from the internal combustion engine is transmitted to the electric motor when the switching clutches are closed. The consequential advantage is that the electric motor is not over-revved when the maximum rotation speed of the internal combustion engine is higher than that of the electric motor, which would otherwise increase the energy consumption.

It is further advantageous that the use of a one-way clutch represents a lower construction effort which, in turn, reduces the manufacturing costs of the pump system.

It is further preferred that the pumps of the pump system are constant displacement pumps and/or variable displacement pumps and/or switching pumps, in particular flow pumps or positive displacement pumps. In constant pumps, the output is not adjustable and their operation or performance is directly dependent on the operation or performance of the internal combustion engine or the electric motor. However, in the present pump system, the operation of the constant displacement pumps is variable due to the detachable coupling, by means of clutches, to the internal combustion engine or the electric motor. The resulting advantage is that due to the use of constant displacement pumps, the construction effort and the costs can be reduced compared to the use of variable displacement or switching pumps, and the overall efficiency can be increased.

The present invention further provides a method of operating a pump system in a motor vehicle, comprising driving a first pump and a second pump by an electric motor and/or an internal combustion engine by coupling the first pump and a second pump.

The method thus ensures that a first pump and a second pump can be driven both decoupled, consequently independently of each other, and also coupled by an internal combustion engine and/or an electric motor. In this way, the required volume flow rate and pressure are adjusted variably, individually and depending on the demand in the motor vehicle by switching on and off the two pumps. This has the advantage that only the actually required volume flow rate and pressure are provided. Hence, a pump is only driven when a volume flow rate and pressure are required, and the energy consumption is reduced compared to a permanently driven pump.

A further advantage is that a pump can be operated in a power range that is optimal in terms of its energy consumption. In other words, a pump can be switched on when the required volume flow rate and pressure correspond to the volume flow rate and pressure at which the pump operates efficiently in terms of its energy consumption. At the same time, it is possible to switch off a pump when the operation falls into a performance range that can be covered more efficiently by a different pump. Thus, the energy fuel consumption of a motor vehicle is ultimately reduced.

It is a further advantage that the present pump system makes use of pumps which are already used as standard in a motor vehicle. This makes it possible to keep the construction effort and consequently the manufacturing costs of the pump system low.

A preferred embodiment of the method is characterized in that the internal combustion engine drives the first pump by coupling a first clutch, and the electric motor drives the second pump by coupling a third clutch, or the internal combustion engine drives the first pump and the second pump by coupling a first clutch and the third clutch, or the electric motor drives the first pump and the second pump by coupling the second clutch and the third clutch. It thus becomes possible that the first pump can also be driven independently of the internal combustion engine by coupling to the second pump which is coupled to the electric motor. Conversely, the second pump can also be driven independently of the electric motor by coupling to the first pump which is coupled to the internal combustion engine. Moreover, the first pump, the internal combustion engine, and the second pump, coupled to the electric motor, can be driven independently of each other. This has the advantage that the pump capacity of both pumps can be used when the internal combustion engine in the vehicle is switched off. However, if there is not enough electric energy available in the motor vehicle, the internal combustion engine can take over the driving of both pumps. Hence, the pump system or both pumps can be operated independently of the power supply state of the motor vehicle.

Furthermore, it is advantageous when there is a high demand for volume flow rate and pressure that only the drive power of the internal combustion engine can be used to drive both pumps since the operation in the upper power range of the pumps can be carried out more efficiently by the internal combustion engine.

At the same time, it is advantageous when there is a low demand for volume flow rate and pressure, to drive only the second pump by means of the electric motor, by de-coupling the first pump from the internal combustion engine and from the second pump, since in the lower power range of the pumps, the drive with the electric motor is more efficient.

BRIEF DESCRIPTION OF DRAWINGS

Further features and advantages of the devices and the method are apparent from the following description of the embodiments with reference to the enclosed drawings. From these drawings shows.

DESCRIPTION OF AN EMBODIMENT

It is clear to the skilled person that individual features described in different embodiments can also be implemented in a single embodiment, provided they are not structurally incompatible. Similarly, various features described in the context of a single embodiment can also be provided in several embodiments, either individually or in any suitable sub-combination. Moreover, all the features mentioned above or below with reference to the method are applicable to the system and vice versa.

Figure 1:
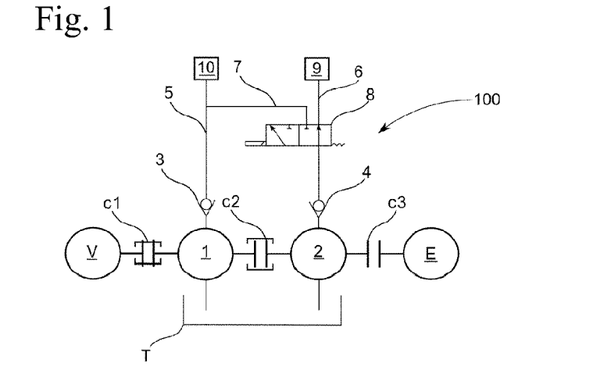
FIG. 1 a schematic circuit diagram of the pump system.

FIG. 1 shows a schematic circuit diagram of one embodiment of a pump system 100. The pump system 100 comprises an internal combustion engine V that is configured in particular as the main unit for driving the motor vehicle, and is also known as internal combustion machine. The internal combustion engine V can, for example, be an in-line engine, a V-engine, a VR-engine, an H-engine, a W-engine, a boxer engine, a radial engine or the like.

Furthermore, according to this embodiment, an electric motor E is provided for the pump system 100, the power of which is preferably lower than that of the internal combustion engine V. However, the electric motor E can also be configured such that it can also be used as the main unit for driving the motor vehicle. For example, the electric motor E can be configured as a three-phase, linear, alternating current, direct current, universal, repulsion motor or the like.

According to the embodiment, the pump system 100 includes a first pump 1, also referred to as a main pump, and a second pump 2, also referred to as a secondary pump. The first pump 1 is preferably dimensioned larger than the second pump 2. Larger dimensioned is understood to mean a larger output as a result of a larger stroke volume. According to the embodiment, the pumps 1, 2 are preferably provided as constant pumps; however, they can also be configured as variable and/or switching pumps if required. The pumps 1, 2 are, for example, axial, diagonal, radial, rotary, centrifugal, impeller pumps or the like. The output performance of fixed displacement pumps is in particular directly dependent on the transmitted power of the drive units. In other words, the delivered volume flow rate and the pressure applied is determined by the transmitted torque of the internal combustion engine V or the electric motor E.

In the pump system 100 of this embodiment, the internal combustion engine V and the first pump 1 are coupled by a first clutch c1. It is thus possible to transmit a torque generated by the internal combustion engine V to the pump 1. In particular, the clutch c1 couples a shaft driven by the internal combustion engine V to another shaft driving the first pump 1. The clutch c1 is configured in particular as a shifting clutch, and therefore the shaft of the first pump 1 and the shaft of the internal combustion engine V can be optionally disconnected or connected. In addition, it is preferred that the clutches can be actuated, for example, mechanically, electromechanically, hydraulically or pneumatically so that they can be controlled by a control unit.

A second clutch c2 couples the first pump 1 and the second pump 2. This clutch is also preferably provided as a shifting clutch and can accordingly be operated as described above, thus can be optionally disconnected or connected. In this manner, a torque applied to the first pump 1 can be transmitted to the second pump 2. The clutch c2 couples in particular the shaft of the first pump and a shaft of the second pump 2.

In the present embodiment of the pump system, the electric motor E is coupled to the second pump 2 by the clutch c3. In particular, it is preferred that this clutch is a one-way clutch, and therefore this one-way clutch has a freewheel, particularly preferred in the direction opposite to the running direction of the electric motor E. This means that the electric motor cannot be decoupled from the second pump. Thus, it is possible to transmit a torque generated by the electric motor E to the pump 2. The clutch c3 couples in particular a shaft driven by the electric motor E to another shaft driving the second pump 2.

Further provided in the pump system 100 of the present embodiment is a tank T which serves as a storage container of the fluid to be pumped, in particular an oil-based fluid. According to the schematic circuit diagram, the tank T is connected to the suction side of the pumps 1,2 via a connecting line.

Furthermore, the pump system 100 is configured such that a check valve 3, 4 is installed in the pressure line 5, 6 of the pumps 1, 2, which pressure line is accordingly provided on the pressure side of the pumps 1, 2, and therefore a backflow of the fluid in the direction of the pumps is prevented.

According to the circuit diagram, the pump system 100 is configured such that downstream of the check valves 3, 4, the pressure lines 5, 6 of the first pump 1 and the second pump 2 are connected via a connecting line 7, wherein a hydraulic valve 8 is installed in particular at the junction between the pressure line of the second pump 2 and that of the connecting line 7, which hydraulic valve controls the fluid flow through the connecting line 7.

In the described embodiment, the pump system 100 is intended to supply a first target unit 10 and a second target unit 9 with a specific volume flow rate of the fluid and a specific pressure. The first target unit 10 is in particular a hydraulic control unit of a transmission, in which a specific pressure is required for the setting of various hydraulic actuators. The hydraulic actuators are, for example, part of a transmission, in particular an automatic transmission, of a motor vehicle. In a second target unit 9, for example, a transmission, in particular an automatic transmission, of a motor vehicle is to be lubricated and cooled with the pumped fluid.

One example of a method for driving a pump system 100 in a motor vehicle is described below by way of examples with reference to FIGS. 2, 3, and 4A-4E. For this purpose, different operation modes of the method are explained, which correspond to selected operating states of the motor vehicle.

Figure 2:
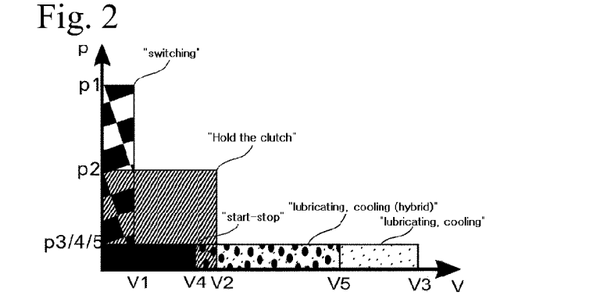
FIG. 2 a pressure-volume flow-rate diagram of the individual operating states of the pump system.
Figure 3:
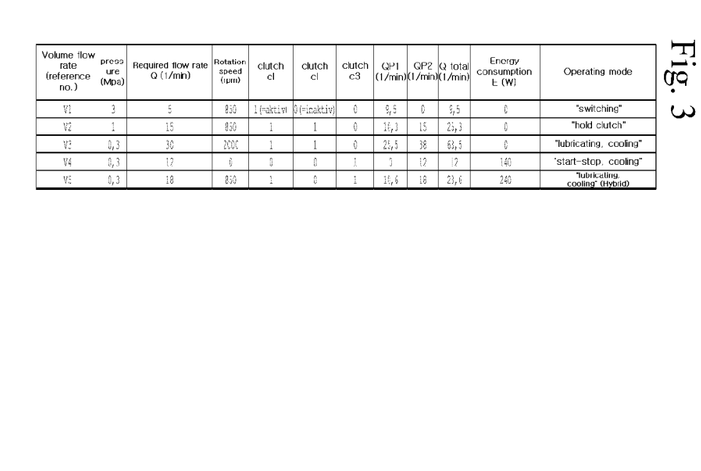
FIG. 3 a table of the different coupling possibilities of the clutches according to the operating conditions of the pump system.
Figure 4A:
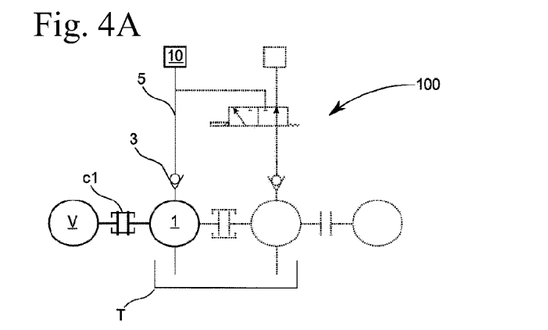
FIG. 4A a schematic circuit diagram of the pump system during the switching process of the motor vehicle.
Figure 4B:
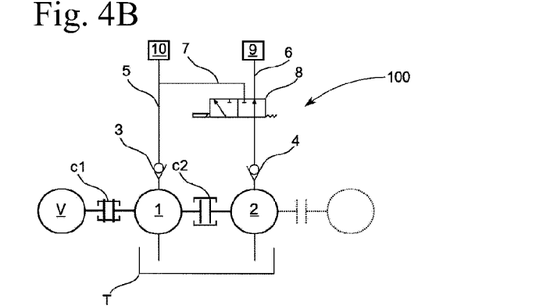
FIG. 4B a schematic circuit diagram of the pump system during the clutch-hold process of the motor vehicle.
Figure 4C:
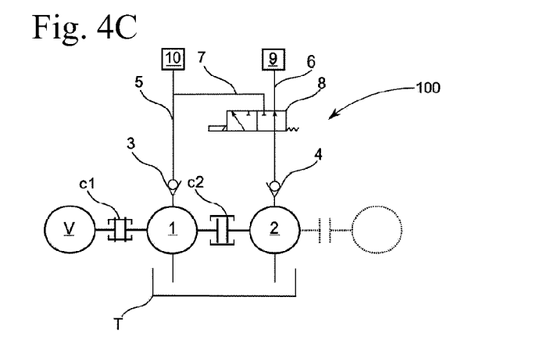
FIG. 4C a schematic circuit diagram of the pump system during cooling and lubrication of the transmission of the motor vehicle.
Figure 4D:
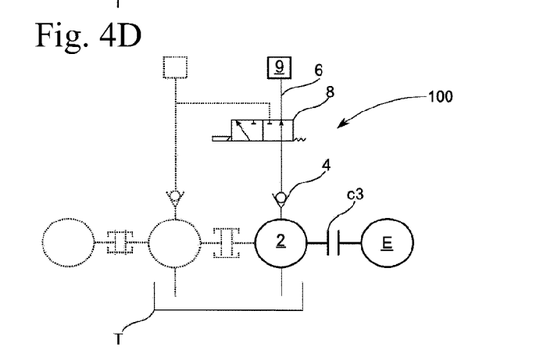
FIG. 4D a schematic circuit diagram of the pump system during the start-stop operation of the motor vehicle.
Figure 4E:
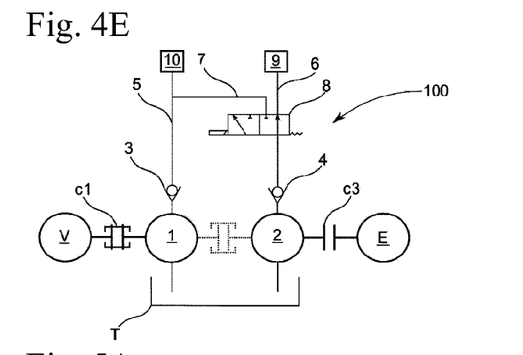
FIG. 4E a schematic circuit diagram of the pump system during cooling and lubrication of the transmission of the motor vehicle in hybrid mode.

FIG. 2 is a pressure/volume flow rate diagram reflecting the need for a fluid volume flow rate in connection with a required pressure of the fluid with regard to different operating states of the motor vehicle. The operating states refer, inter alia, to a transmission, in particular an automatic transmission, and the drive mode of a motor vehicle. In particular, a distinction is made here between the operating states "shifting", "hold clutch", "lubrication and cooling". Additionally, there are the operating states "start-stop" and "hybrid". These operating states can also be understood as temporal phases or processes during the operation of a motor vehicle.

The operating state "shifting" includes in particular the changing of a gear or, in other words, the change in the speed ratio in the transmission. During this process, the pressure $p1$ and the volume flow rate $V1$ are required.

The operating state "hold clutch" describes in particular the state in which the shifting clutch must be actively actuated for gear selection. During this process, the pressure $p2$ and the volume flow rate $V2$ are required.

The operating state "lubrication and cooling" is preferably provided during the transmission of torque through the transmission via the drive train to the wheels of the motor vehicle or, in other words, while power is being transmitted via the transmission. During this process, the pressure $p3$ and the volume flow rate $V3$ are required.

The operating state "start-stop" is preferably present when the motor vehicle is not in motion. During this operating state, in particular the internal combustion engine V is not in operation. During this process, the pressure $p4$ and the volume flow rate $V4$ are required.

The "hybrid" operating state is provided when the internal combustion engine V and the electric motor E are preferably operated in the motor vehicle. During this process, the pressure $p5$ and the volume flow rate $V5$ are required.

The following applies in particular to the required volume flow rate of the embodiment described here: $V1<V4<V2<V5<V3$ The following applies in particular to the required pressure of the fluid in the embodiment described here: $p1>p2>p3=p4=p5$ According to the above-described operating states of the motor vehicle, FIGS. 3 and 4A-4E illustrate the operation of the first pump 1 and the second pump 2, which are driven by the drive units V and E by coupling the clutches c1, c2, c3.

During the operating state "switching" (FIG. 4A) in the motor vehicle, the volume flow rate V1 and the pressure p1 are required. This volume flow rate and pressure are supplied particularly efficiently in terms of the drive energy required for this purpose by operating only the first pump 1 by means of the internal combustion engine V. In other words, due to the operation of the first pump 1 by coupling to the internal combustion engine V, the energy consumption to provide the required volume flow rate and pressure are lower than in all other configurations. Put differently, in the required power range, the energy required for operating the pump 1 is lowest by coupling to the internal combustion engine V. The clutch c1 is coupled for this purpose. However, the clutch c2 remains open and the electric motor E is out of operation. During the shifting process, the oil-based fluid is delivered from the tank 1 to the hydraulic control unit 10 by means of the first pump 1, as a result of which a setting of the actuators in the transmission, and thus "shifting", is made possible.

During the operating state "hold clutch" (FIG. 4B) in the transmission, the volume flow rate V2 and the pressure p2 are required. This volume flow rate and pressure are supplied particularly efficiently in terms of the drive energy required for this purpose by operating the first pump 1 and the second pump 2 by means of the internal combustion engine V. To this end, the clutches c1 and c2 are coupled, and the electric motor E is out of operation. Due to the idling of the one-way clutch c3 in the direction opposite to the direction of rotation of the internal combustion engine V, no torque is applied to the electric motor E. While the clutch of the gear is held, the oil-based fluid is delivered, by means of the first pump 1 and the second pump 2, from the tank 1 to the hydraulic control unit 10 and into the transmission 9. The clutch is held in the transmission of the vehicle, which transmission is lubricated and cooled at the same time.

During the operating state "lubrication and cooling" (FIG. 4C) in the motor vehicle, the volume flow rate V3 and the pressure p3 are required. This volume flow rate and pressure is also supplied particularly efficiently in terms of the drive energy required for this purpose by operating the first pump 1 and the second pump 2 by means of the internal combustion engine V. In other words, in the required power range, the energy necessary to operate the pumps 1 and 2 is lowest by coupling to the internal combustion engine V. To this end, the clutches c1 and c2 are coupled, and the electric motor E is out of operation. Due to the idling of the one-way clutch c3 in the direction opposite to the direction of rotation of the internal combustion engine V, no torque is applied to the electric motor E. During this operating state of the motor vehicle, the oil-based fluid is delivered, by means of the first pump 1 and the second pump 2, from the tank T to the hydraulic control unit 10 and into the transmission 9. The transmission is lubricated and cooled.

During the operating state "start-stop" (FIG. 4D) in the motor vehicle, the volume flow rate V4 and the pressure p4 are required. This volume flow rate and pressure are supplied particularly efficiently in terms of the drive energy required for this purpose by operating the second pump 2 by means of the electric motor E since the operation of the internal combustion engine can be dispensed with in this operating state of the motor vehicle. During the start-stop operation of the motor vehicle, the clutch c3 is coupled and the second pump 2 pumps the oil-based fluid from the tank 1 into the transmission 9, thus cooling the latter. Furthermore, it is possible to additionally switch on the first pump 1 by actuating the clutch c2 (not shown in FIG. 4D) in order to further increase the volume to be conveyed.

During the "hybrid" operating state (FIG. 4E) in the motor vehicle, the volume flow rate V5 and the pressure p5 are required. This volume flow rate and pressure are also supplied particularly efficiently in terms of the drive energy required for this purpose by operating the first pump 1 by means of the internal combustion engine V and the second pump 2 by means of the electric motor E. The clutch c1 is coupled for this purpose. During this operating state of the motor vehicle, the oil-based fluid is delivered, by means of the first pump 1 and the second pump 2, from the tank 1 to the hydraulic control unit 10 and into the transmission 9 for cooling and lubrication.

In one embodiment, which is not shown in the figures, the pump system is configured such that only one drive unit is provided which is either an internal combustion engine V or an electric motor E. In this case, the drive unit is coupled to the first pump 1 or the second pump 2 either with the shifting clutch c1 or the one-way clutch c3. In this embodiment, too, the pumps 1, 2 are also switched according to the above-described principle using clutch c2, and therefore the pumps are operated in the power range which is particularly efficient with regard to the required energy.

Figure 5A:
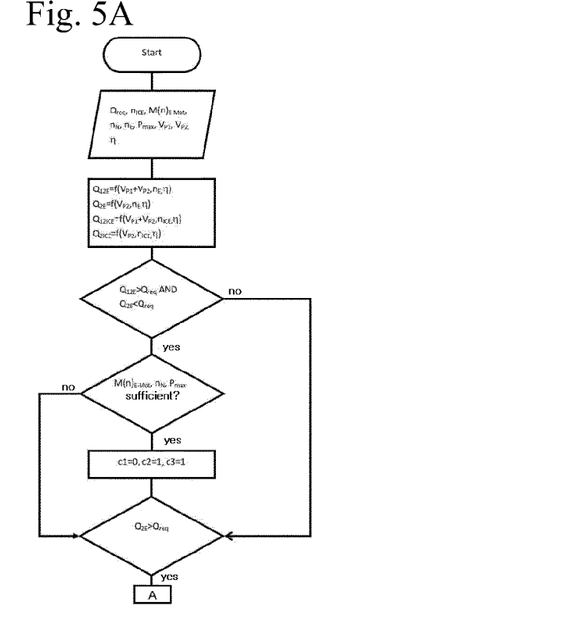
FIG. 5A a flow diagram for the actuation of the clutches according to the operating states.
Figure 5B:
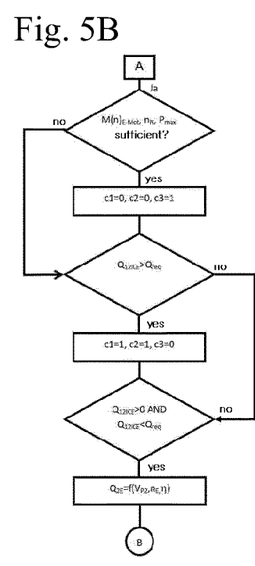
FIG. 5B a flow diagram for the actuation of the clutches according to the operating states.
Figure 5C:
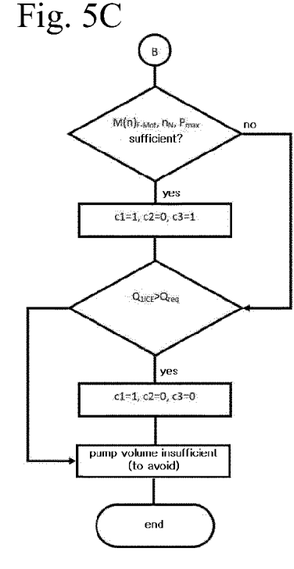
FIG. 5C a flow diagram for the actuation of the clutches according to the operating states.

FIGS. 5A, 5B, and 5C show a coherent flow diagram illustrating the actuation of the clutches according to the operating states described above in connection with corresponding method parameters. The required volume flow rate ($Q_{req}$) in the individual operating states is estimated since the pump system in this embodiment does not have corresponding sensors to determine $Q_{req}$. The parameters described in FIGS. 5A, 5B, and 5C are abbreviated as follows:

$Q_{req}$: required volume flow rate for an operating state
$n_{ICE}$: torque internal combustion engine
$M(n)$ $E_{mot}$: electric motor torque in relation to the torque of the electric motor
$n_N$: nominal rotation speed of the electric motor
$n_E$: current rotation speed of the electric motor
$P_{max}$: maximum available power of the electric motor
$V_{P1/P2}$: cylinder capacity of the pumps P1 and P2
Q2E: volume flow rate of P2 driven by the electric motor: Q2 ($n_E$)
Q12E: volume flow rate of P1+P2 Q1 (n+Q2 ($n_E$)
$Q1_{ICE}$: volume flow rate of P1 driven by the internal combustion engine: Q1 ($n_{ICE}$)
Q12 ICE: volume flow rate of P1+P2 driven by the internal combustion engine: Q1 ($n_{ICE}$)+$Q^2$ ($n_{ICE}$)
η: general efficiency factors

LIST OF REFERENCE NUMBERS 1 first pump
2 second pump
3 check valve
4 check valve
5 pressure line
6 pressure line
7 connecting line
8 hydraulic valve
9 transmission of the motor vehicle
10 hydraulic control unit
100 pump system
c1 shifting clutch
c2 shifting clutch
c3 one-way clutch
E electric motor
T tank
V internal combustion engine

The invention claimed is:

1. A pump system for a motor vehicle, the pump system comprising:
   a first pump selectively driven by an electric motor and an internal combustion engine; and
   a second pump selectively driven by the electric motor and the internal combustion engine, wherein the internal combustion engine and the first pump are selectively coupled by a first clutch, and the first pump and the second pump are selectively coupled by a second clutch, and the electric motor and the second pump are selectively coupled by a third clutch.

2. The pump system according to claim 1, wherein a pressure line of the first pump and a pressure line of the second pump are connected via a connecting line.

3. The pump system according to claim 2, wherein at least one controllable or non-controllable valve is installed in at least one of the pressure line of the first pump, the pressure line of the second pump, and the connecting line.

4. The pump system according to claim 3, wherein the at least one controllable or non-controllable valve is a flow valve, a check valve, a pressure valve, or a directional control valve.

5. The pump system according to claim 2, wherein the pressure line of the first pump and the pressure line of the second pump are connected to at least one target unit.

6. The pump system according to claim 5, wherein a first target unit of the at least one target unit is a hydraulic control unit and a second target unit of the at least one target unit is a unit for a transmission.

7. The pump system according to claim 2, wherein at least one controllable or non-controllable valve is installed in the connecting line.

8. The pump system according to claim 7, wherein the at least one controllable or non-controllable valve is a flow valve, a check valve, a pressure valve, or a directional control valve.

9. The pump system according to claim 1, wherein the first clutch and the second clutch are shifting clutches, and the third clutch is a one-way clutch.

10. The pump system according to claim 9, wherein the one-way clutch has a freewheel against a direction of rotation of a shaft of the internal combustion engine.

11. The pump system according to claim 9, wherein the shifting clutches are actuated mechanically, electromechanically, hydraulically or pneumatically.

12. The pump system according to claim 1, wherein the pumps are constant displacement pumps, variable displacement pumps, or switching pumps.

13. A motor vehicle comprising the pump system according to claim 1.

14. A method of operating a pump system in a motor vehicle, the method comprising:
   selectively driving a first pump and a second pump by an electric motor and an internal combustion engine by selectively coupling the first pump and the second pump, wherein:
   when in a first operating state of the pump system, the internal combustion engine drives the first pump and the second pump by coupling a first clutch and a second clutch;
   when in a second operating state of the pump system, the internal combustion engine drives the first pump by coupling the first clutch, and the electric motor drives the second pump by coupling a third clutch; and
   when in a third operating state of the pump system, the electric motor drives the first pump and the second pump by coupling the second clutch and the third clutch.

* * * * *